Feb. 11, 1958  E. F. REEDY ET AL  2,823,378
AIRCRAFT NAVIGATION INSTRUMENT
Filed April 7, 1954  5 Sheets-Sheet 1

INVENTORS
EUGENE F. REEDY
REGINALD V. CRADDOCK
BY
R.V. Craddock
ATTORNEY

Feb. 11, 1958 E. F. REEDY ET AL 2,823,378
AIRCRAFT NAVIGATION INSTRUMENT
Filed April 7, 1954 5 Sheets-Sheet 2

INVENTORS
EUGENE F. REEDY
REGINALD V. CRADDOCK
BY
ATTORNEY

Fig. 6.

INVENTORS
EUGENE F. REEDY
REGINALD V. CRADDOCK
ATTORNEY

Feb. 11, 1958 E. F. REEDY ET AL 2,823,378
AIRCRAFT NAVIGATION INSTRUMENT
Filed April 7, 1954 5 Sheets-Sheet 4

INVENTORS
EUGENE F. REEDY
REGINALD V. CRADDOCK
BY
ATTORNEY

Feb. 11, 1958     E. F. REEDY ET AL     2,823,378
AIRCRAFT NAVIGATION INSTRUMENT
Filed April 7, 1954                                      5 Sheets-Sheet 5

INVENTORS
EUGENE F. REEDY
REGINALD V. CRADDOCK
BY
ATTORNEY

United States Patent Office 2,823,378
Patented Feb. 11, 1958

2,823,378

AIRCRAFT NAVIGATION INSTRUMENT

Eugene F. Reedy, Merrick, and Reginald V. Craddock, New Hyde Park, N. Y., assignors to Sperry Rand Corporation, a corporation of Delaware Application April 7, 1954, Serial No. 421,580

17 Claims. (Cl. 343—107)

This invention relates generally to aircraft navigation instrumentation, and more particularly to a navigational aid for manually piloted aircraft wherein the pilot is relieved of the need of scanning and simultaneously interpreting the information supplied by a number of independent or separately mounted flight instruments. With the instrument of the present invention the pilot is also relieved of the task of anticipating the amount of control demanded by such interpretation and is yet provided with an indication of the information normally supplied by these independent instruments and of the actual amount of control so applied. The present invention relates to a navigational aid for manually piloted aircraft which is an improvement over the instrument set forth in U. S. Patent No. 2,613,352, issued to S. Kellogg 2nd, on October 7, 1952, for a Radio Navigation System, which patent is assigned to the same assignee as the present application.

The instrument of the present invention not only supplies information which is the result of a combination of attitude, heading and radio information which is combined and correlated to provide a displacement of a minimum number of indicating elements such as, for example, a cross pointer meter, but further supplies additional information regarding the actual attitude and heading of the craft when piloted in accordance with the commands of the cross pointers. As set forth in the above Kellogg patent, the maneuver command cross pointer bars or guidance indicators when symmetrically disposed one with the other relative to a reference index representing the aircraft, the pilot is advised that his craft is flying correctly in accordance with a selected flight plan, although perhaps not on a given or selected flight course. As further stated in the above-mentioned patent, such a plan may call for the use of an indicating system as a flight instrument for "dead-reckoning" flights, or as a radio navigation instrument utilizing radio range system signals, or for making approaches on an instrument landing system (I. L. S.) to an airport under adverse weather conditions. Once a specific flight plan has been selected or chosen, the pilot causes the aircraft to approach and thereafter follow this flight plan by making the indicated attitude changes dictated by the instantaneous deflections of the bars of the cross pointer indicator. Therefore, to achieve the object of any selected flight plan, it is only necessary for the pilot to follow the dictates of the cross pointer or guidance indicator, interpretation and correlation of the indications of other flight instruments not being necessary.

However, it has been found that although perfectly coordinated flight maneuvers in seeking a selected flight path are achievable by constantly maintaining the guidance pointers symmetrically disposed in the face of the instrument, it has been found desirable to display on the same instrument information representative not only of the position and heading of the craft relative to the given flight path, but also the attitude of the craft relative to the horizon which, as set forth in the said Kellogg Patent No. 2,613,352, is the control parameter of the system. With the indicator of the present invention, the information regarding the craft's position and attitude is displayed relative to an index representing the craft which is common to the index against which the guidance indicator is read. In the instrument of the present invention this common reference is so arranged on the face of the instrument that when the craft is proceeding along the desired or selected flight path such as a selected magnetic heading or a selected radio beam, the heading and attitude indicators and the guidance indicator will all lie in substantial alignment thereby providing the pilot with an indication which is representative of the straight line or course along which he is proceeding, any deviations of the craft from the straight line course being displayed by a discontinuity or break in the line provided by the instrument indicators.

It is, therefore, a primary object of the present invention to provide an improved navigational instrument for enabling a pilot to fly an aircraft in accordance with a selected flight plan. It is another object of the present invention to provide a navigational instrument which displays to the pilot not only information which will enable the pilot of the craft to follow a preselected flight plan merely by controlling the attitude of the craft in accordance with the indications presented to him by a guidance indicator, the craft being guided thus to approach and maintain the selected flight plan, but also to supply the pilot information regarding the actual craft attitude so controlled, this information being displayed with reference to the same reference index against which the guidance indicator is read.

Generally, the instrument of the present invention comprises an instrument housing having a preferably circular opening therein through which the various elements of the instruments may be observed. Viewable through the opening is an annular compass card which is stabilized relative to the magnetic meridian by means of a suitable magnetic compass or slaved gyro magnetic compass. A course selector settable relative to the compass card is provided for setting the magnetic bearing of a selected flight path and once it is set, it moves with the compass card so that the pilot is always informed of the actual heading of the craft relative to the selected path or course. Within the opening defined by the annular compass card there is provided an annular member or ring which is fixed relative to the instrument housing and within the opening defined by this ring there is situated the elements of the guidance indicator. The guidance indicator includes a substantially straight horizontal bar or pointer and a similar vertical bar or pointer each relatively movable within the opening in the fixed ring. In one embodiment of the present invention, these bars are mounted to move in a parallel relation to the face of the instrument in order to overcome any parallax effects. The bars or pointers are displaced in accordance with the outputs of a computer which combine and correlate information regarding the attitude, heading, and radio information in a manner set forth in the above-noted Kellogg patent. As stated, the pilot flies his craft in accordance with the instantaneous deflection of these guidance indicator bars, and by maintaining them in a symmetrical relation, e. g., zeroed, through proper control of the attitude of the craft, the craft will be guided so as to approach and maintain the selected flight path.

Situated directly behind the guidance indicator and also viewable through the opening defined by the fixed ring is an attitude indicator which comprises, in one embodiment, a preferably flat surface such as a flexible screen stretched between suitable rollers and having an horizon-defining line thereon, the area above the line preferably being colored in a light shade and the area below the line preferably being colored in a contrasting dark shade. With the craft in straight and level flight the line will divide the opening defined by the fixed ring into two equal parts. Also provided on the flat surface are a series of markings which may be either short horizontal lines or dots spaced one above the other which when viewed as a whole, define a vertical roll attitude indicating line on the surface of the screen.

The fixed ring, disposed between the guidance and attitude indicators and the annular compass card and heading selector, has inscribed thereon a reference index, representative of the craft, and against which all of these indicators may conveniently be read. This reference index is preferably located at the top of the fixed ring so that when the craft is proceeding along the desired or selected flight path the guidance indicator, roll attitude indicator, heading selector, and selected compass card calibration will all lie in relative alignment. Therefore, the pilot upon viewing the instrument will see a substantially straight line vertically disposed within the instrument opening which is a representation of the straight line course along which he is proceeding. If the craft deviates from the straight line course, the elements of the instrument will no longer lie in alignment thereby quickly informing the pilot of such deviation, and by following the dictates of the guidance indicator the representative line will again be formed with respect to the common reference index.

Other objects and advantages, not at this time particularly enumerated, will become clearly apparent from the following detailed description of exemplary embodiments of this invention when considered in connection with the accompanying drawings wherein.

Figure 1:
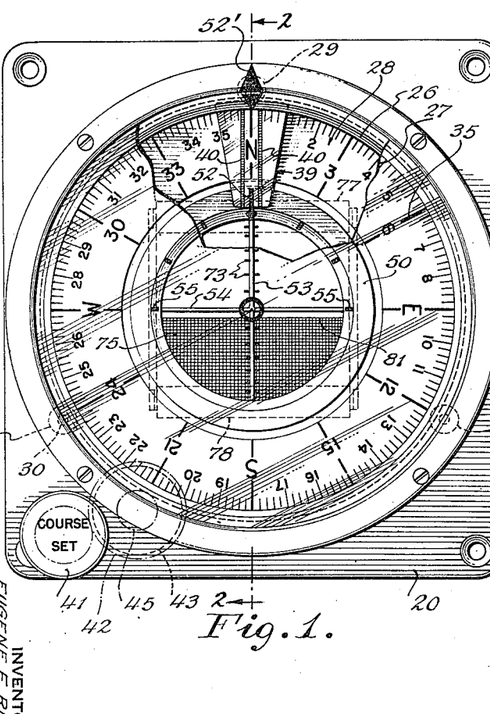
Fig. 1 is a front elevation view of the face of the instrument of the present invention as seen by the pilot.
Figure 2:
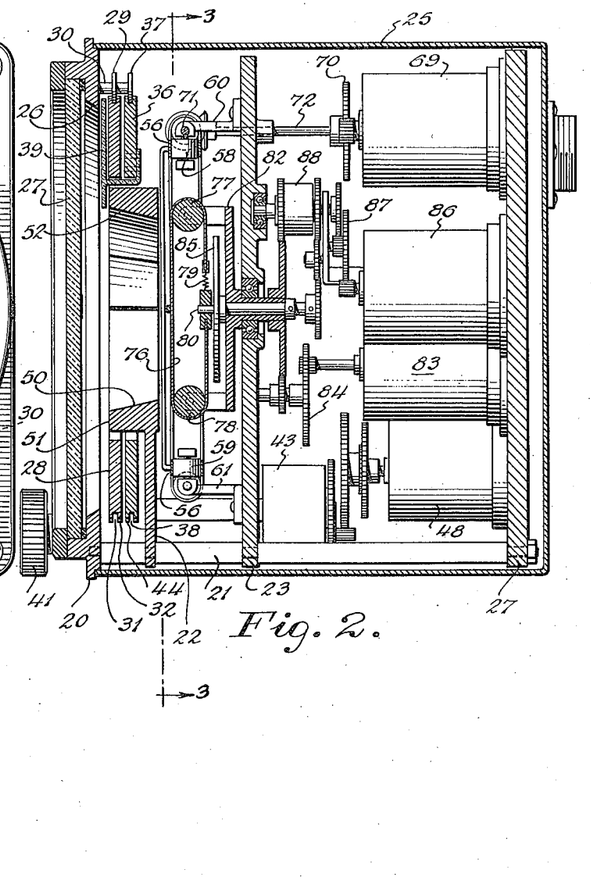
Fig. 2 is a sectional view of the instrument taken in about the plane 2—2 of Fig. 1.
Figure 3:
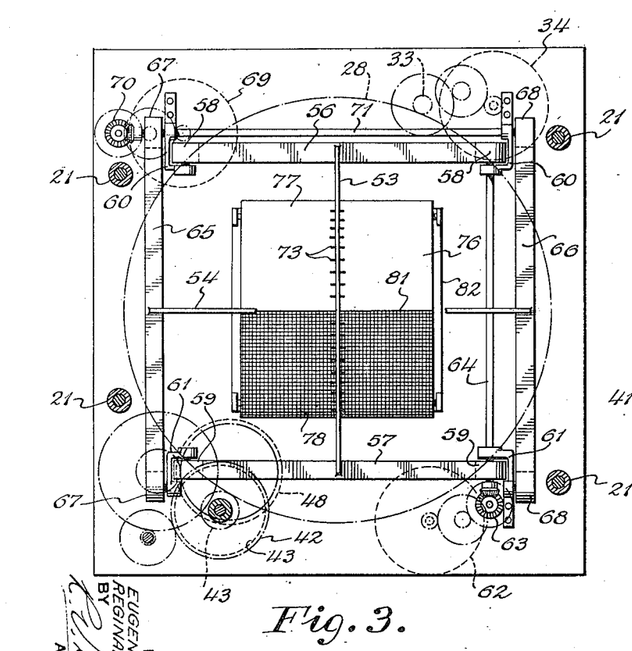
Fig. 3 is a sectional view of the instrument taken in about the plane 3—3 of Fig. 2.

Referring now to Figs. 1, 2, and 3, the instrument housing comprises a front frame or bezel member 20 which forms the main supporting structure for the entire instrument. This bezel is adapted to be secured to the instrument panel of an aircraft in any conventional manner. Rigidly supported by bezel 20 are a plurality of studs 21 to which, in turn, are secured plate members 22, 23, and 27 upon which the various indicating elements and actuators therefor are supported. A cover 25 is further provided for sealing the interior of the instrument against dirt, dust, moisture, etc., the covering having a suitable socket for the required electrical connections. The bezel 20 is formed with a preferably circular opening 26 through which the various indicating elements are viewable. A bezel glass 27 covers the opening and together with a suitable gasket serves to seal the instrument.

The compass card 28 of the instrument comprises a flat, annular member rotatably supported on the bezel 20 by means of flat rollers 29 which in turn are rotatably mounted on studs 30 disposed about the bezel opening 26. Around the periphery of the compass card is a groove 31 into which the rollers 29 fit and peripheral gear teeth 32 engaged by the driving gear 33 provide a positioning means for the card. Compass card 28 is stabilized relative to magnetic north through compass card drive motor or servomotor 34 in a manner to be hereinafter more fully described. The card 28 is provided with the usual compass calibrations 35 so that the heading of the craft may be determined by the calibration appearing at a reference index or lubber line fixed relative to the instrument housing or at the common craft index 52.

Directly behind compass card 28 is a similar annular member 36 which is also rotatably mounted on the instrument bezel by means of similar support rollers 37 rotatably mounted on studs 30, the rollers 37 engaging a peripheral slot 38 in the member 36. Member 36 carries a course selector member or cursor 39 which extends through an annular opening defined by compass card 28 and a fixed annular member 50 so that it is visible on the face of the instrument. In the present embodiment, the course selector or cursor 39 comprises a flat, transparent member which extends over the face of the compass card 28 so that the calibrations of the compass card may readily be read therethrough. The transparent course selector 39 has painted or otherwise delineated thereon a pair of parallel reference lines 40. In setting the course selector 39 relative to the calibrations 35 of the compass card 28 the course selector 39 is rotated so that the parallel lines lie equidistantly on each side of the selected heading calibration.

Figures 4, 5:
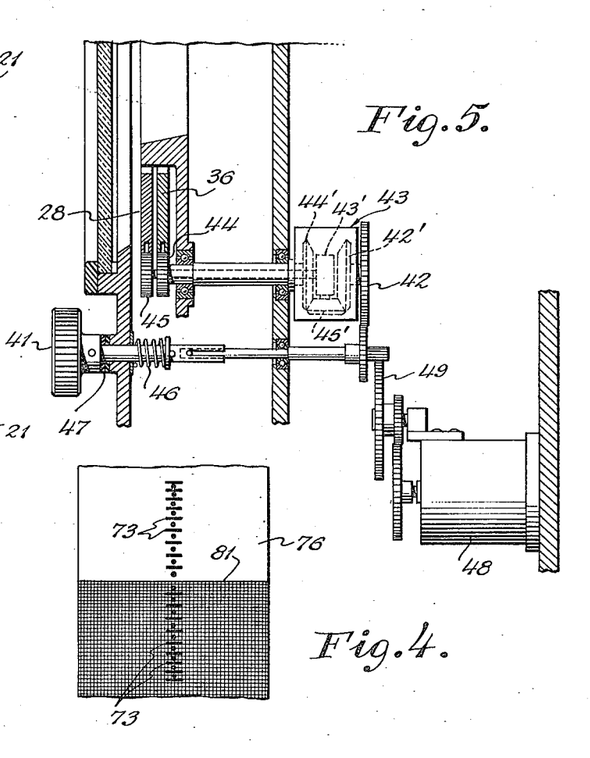
Fig. 4 is a fragmentary view of a development of a portion of the instrument illustrated in Fig. 1.
Fig. 5 is a generally schematic sectional view of a portion of the instrument illustrated in Fig. 1.

The means for setting the course selector relative to the compass card is clearly indicated in Fig. 5. As shown in this figure, a course set knob 41 is provided which, when pulled outwardly and rotated, drives one input member 42, 42', of differential 43. During a course setting operation the compass card 28 can be considered as being fixed (through a gear train and the compass card servomotor), and therefore gear 45 which is in mesh with the compass card will also be fixed. Thus, the other input member or spider 43' of differential 43 is also fixed. Rotation of input member 42 of differential 43 will, therefore, cause planetary gear 45' to rotate gear 44' thereby rotating output gear 44' and gear 44, which in turn rotates member 36 and attached course selector 39 relative to compass card 28. However, when the knob 41 is released it is urged inwardly by spring 46 thereby locking the knob 41 to the bezel 20 by means of a suitable friction clutch connection 47. When the knob 41 is so locked, input member 42, 42', of differential 43 is also locked or fixed so that planetary gear 45' will rotate thereabout through rotation of spider 43', compass card 28 and compass card servomotor, to thereby rotate gear 44' and output gear 44 and hence course selector 39. Therefore, compass card 28 and course selector 39 will rotate together. The input and output gears of differential 43 are so selected that a 1:1 ratio exists between compass card 28 and course selector 39. When course selector 39 is rotated to a new position, that is, to a new selected heading, a signal voltage transmitter 48, such as a selsyn control transformer, for example, is also rotated through suitable reduction gearing 49. The gear ratio of reduction gearing 49 is so selected that the transmitter will be rotated at a 1:1 ratio with the compass card 28. Therefore, a signal will be generated at transmitter 48 which is proportional to the displacement of the course selector 39 and hence, proportional to the difference between the actual heading of the craft and the selected heading. The signal from control transformer 48 is used in the operation of the guidance indicator in a manner to be hereinafter more fully described.

As above stated, the instrument of the present invention is provided with an annular ring or craft reference member 50 which is positioned within the opening defined by annular compass card 28. This ring is supported in the instrument case by means of frame 22 secured to the instrument support studs 21. In the embodiment of the invention shown in Figs. 1, 2 and 3, annular ring 50 is so shaped as to provide a relatively large surface 51 separating compass card 28 and the guidance and attitude indicators. At the top of ring 50 is a generally radially extending reference mark 52 which serves as the common reference index for all of the moving elements of the instrument which indicate and/or command heading movements of the aircraft. A reference index 52' is provided at the top of the indicator face and may be used as a reference index for the compass card and guidance indicator 53, the alignment thereof being indicative of an "on course" procedure.

Viewable through the opening defined by annular ring 50 are a pair of preferably mutually perpendicular maneuver command indicators or guidance indicator members or pointers 53 and 54, which pointers are normally symmetrically disposed in the opening when the craft is on or correctly approaching a selected course. The vertical or azimuth pointer 53 is in its zero position, aligned with the common craft index 52 while the pitch pointer 54, in its zero position, is aligned with indices 55 suitably inscribed on or connected to fixed ring 50.

In the embodiment illustrated in Figs. 1, 2 and 3, the guidance indicator members are arranged to move parallel to each other and to the face of the instrument thereby substantially eliminating parallax errors. As shown in Figs. 2 and 3, the vertical or direction indicating member is supported at each end thereof on a pair of tapes or bands 56 and 57 each of which extend between and around a pair of rollers 58, 59, respectively pivotally supported on suitable brackets 60 and 61 secured to support member 23. Tape members 56 and 57 are stretched between the roller 58 and are driven together by means of the vertical cross pointer motor 62 through gear train 63 and shaft 64. Vertical pointer servomotor 62 is driven in accordance with electrical signals derived and correlated in a manner to be hereinafter more fully described.

The horizontal pointer or pitch guidance member 54 is driven by a similar arrangement comprising a pair of vertical bands or tapes 65, 66, respectively supported on pulleys 67, 68, which, in turn, are driven by horizontal cross pointer servomotor 69 arranged to drive the pulleys through gear train 70 and shafts 71, 72. Similarly, horizontal pointer motor is actuated by signals generated and correlated in a manner to be hereinafter more fully set forth.

Also viewable through the opening defined by annular member 50 is a horizon or roll and pitch indicator 75 forming a movable background for the guidance indicators 53 and 54. As shown in Figs. 1, 2 and 3, the roll and pitch indicating member 75 comprises a broad, thin, flexible belt-like element 76 preferably of textile fabric, reeved over a pair of spaced rollers 77, 78, and held taut by means of a suitable resilient connection, such as spring 79 coupling the reinforced ends 74 thereof as an endless belt. Pin 80 on disc 85 is arranged to extend into a slot in one of the reinforced ends of the belt 76 for moving the latter upwardly and downwardly across the opening defined by annular member 50. The length of the shade member and the separation of the rollers are so selected that the belt remains in a smooth, taut condition. The element 76 is thus movable in a planar fashion crosswise of the opening defined within the annular compass card 28 and with the broad, flat face thereof presented toward the viewer. Member 76 is provided with a demarcation or horizon line 81, which, in its normal position, divides the opening defined by annular ring 50 into two substantially equal sectors, the sector above the demarcation line 81 being of preferably light color and the sector therebelow being of a darker or contrasting color.

Rollers 77, 78, supporting screen 76 are pivotally supported on a frame 82, which frame in turn is pivotally supported in the instrument frame member 23 by suitable bearings for rotation about the longitudinal axis of the instrument, i. e., the roll axis of the aircraft, and the frame 82 in turn is rotated by means of a suitable roll servomotor 83 coupled with frame 82 through suitable gearing 84. Roll motor 83 is actuated by signals from a suitable vertical reference such as a vertical gyro as described below. In this manner, horizon demarcation line 81 on the screen member 76 is stabilized in roll, i. e., it is maintained substantially parallel to the earth's horizon.

In some applications of the present invention, it may be desirable to change the sensing of the bank attitude indication. In such cases, the polarity of the signal controlling the roll servomotor 83 may be made such that, for example, upon rolling or bank of the craft to the left the horizon line 81 and the meridian line defined by dots 73 will tilt to the left, i. e., in the same direction as the bank. Such sensing will indicate to the pilot the bank attitude of the craft relative to the craft rather than to the earth's horizon. This sensing may be advantageous in the present application inasmuch, for example, if the guidance indicator 53 should be displaced to the left of its normally centered or zero position, the pilot will, in following the commands of the indicator, turn to the left by initiating a left bank. In such cases, the horizon line 81 and meridian line 73 defined by a series of short lines and dots, as will be described, will be tilted toward the guidance indicator 53 indicating to the pilot that his craft is banked in a direction to reduce the displacement of guidance indicator 53 towards its centered or zero position.

For moving the horizontal demarcation line 81 up and down as the craft's pitch attitude changes, there is provided a disc 85 coaxially supported with the frame 82 in the instrument frame member 23. Actuating pin 80 for the shade-like member 76 is eccentrically mounted on disc 85, i. e., at the outer edge thereof, so that upon rotation of the disc 85 actuating pin 80 causes the shade member 76 to be raised or lowered. It will be noted that this construction imparts a desirable movement to the demarcation line 81 in pitch, that is, for small changes in the pitch attitude of the craft movement of the horizon line 81 will be relatively large and rapid but for relatively large pitch attitude changes the movement will be lessened as a function of the sine of the pitch angle thereby increasing the pitch sensitivity for small pitch attitude changes. This is also desirable since the demarcation line will not move completely out of view except for extremely large pitch maneuvers. Disc 85 is actuated by a pitch attitude servomotor 86 through a suitable gear train 87 and differential 88. The function of the differential 88 is to cancel the effects of rotation of frame member 82 as the craft rolls on the rotary motion of the disc 85, since the pitch servomotor is fixed to the instrument housing rather than to the roll stabilized frame 82.

In addition to the horizontal demarcation line 81 there is provided on the screen member 76 a pitch scale which may comprise a series of short lines and dots 73 spaced along a central longitudinal axis of screen member 76 which is perpendicularly disposed relative to the demarcation line 81 as illustrated in a development of a portion of screen 76 illustrated in Fig. 4. This series of lines and dots when viewed as a whole define a vertical line or meridian line on the surface of the screen member 76. The vertical line which is stabilized in roll is used not only as a pitch scale but also as a roll reference line which is referenced to the common craft reference index 52 on the annular ring 50.

Figure 6:
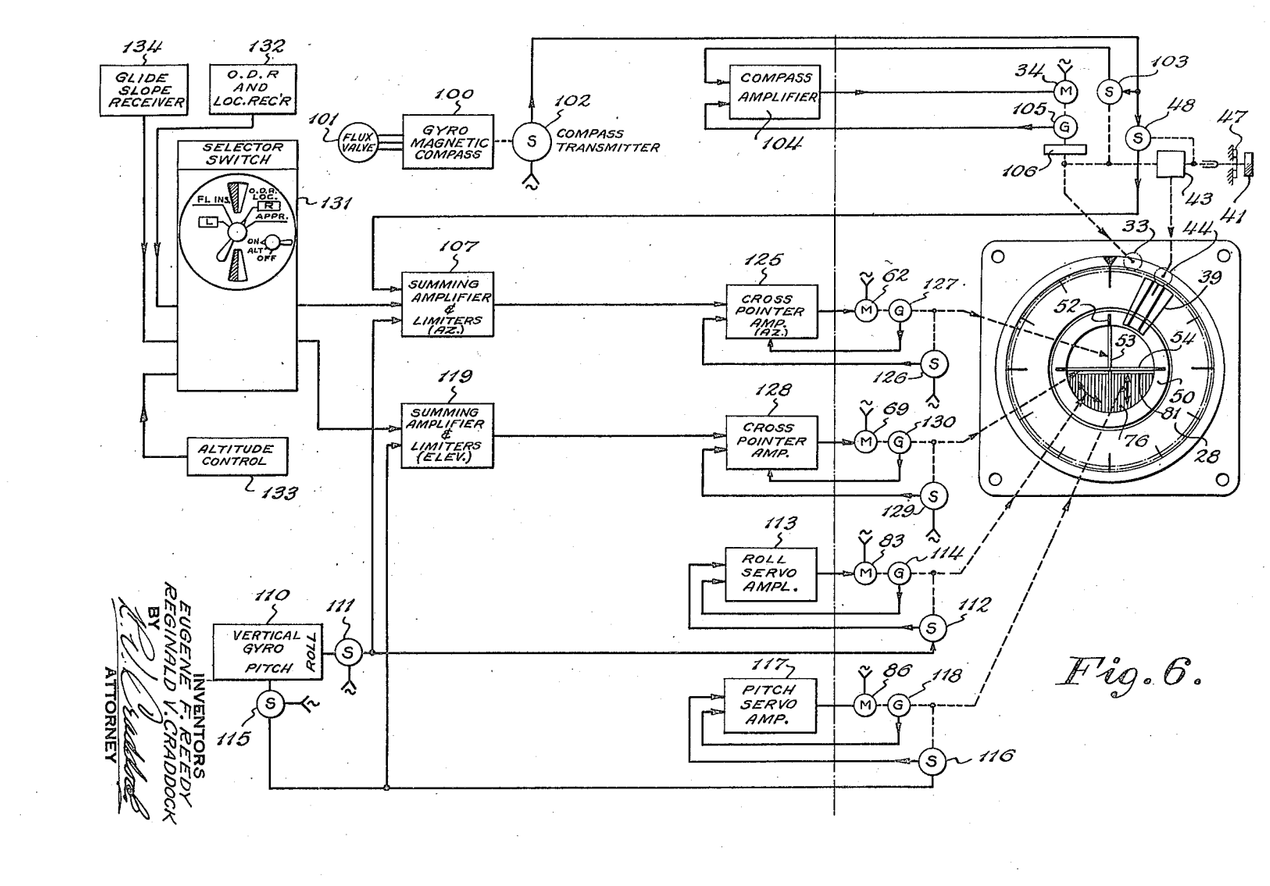
Fig. 6 is a schematic representation of the indicator of the present invention together with the data sources and means for operating the same.

In Fig. 6 there is illustrated schematically the complete control system for the embodiment of the navigation instrument of the present invention illustrated in Figs. 1 through 5. As shown in Fig. 6, the azimuth indicating elements of the instrument which are moved relative to the common craft reference 52 and the elevation indicating elements which are moved relative to the craft reference 55 are positioned by conventional servo systems from signals generated by primary craft references such as radio navigation aids and craft attitude references. Compass card 28 is stabilized relative to a fixed direction in space, such as the magnetic meridian defined by a suitable magnetic compass such as, for example, a gyromagnetic compass 100 controlled from a magnetic direction reference such as flux valve 101. Such a gyromagnetic compass system is disclosed more fully in U. S. Patent No. 2,357,319, issued September 5, 1944, to O. E. Esval et al., assigned to the same assignee as the present application. Attached to the gyromagnetic compass 100 is a compass transmitter 102 such as, for example, a selsyn transmitter, which supplies a signal corresponding to the azimuthal position of the craft's fore and aft axis with respect to the magnetic meridian. Selsyn receiver or control transformer 103 electrically connected with transmitter 102 supplies as its output a signal corresponding to the difference in position of the compass card 28 and the actual position of the craft's fore and aft axis, i. e., the heading of the craft relative to the magnetic meridian, which signal is amplified by means of suitable compass amplifier 104 to actuate compass card servomotor 34 in such a direction and to such an extent as to reduce the signal from control transformer 103 to zero, thereby establishing correspondence between the position of the compass card 28 and the magnetic meridian defined by the gyromagnetic compass 100. A suitable speed generator 105 may be employed in a conventional manner for stabilizing the compass card servo loop. Thus, the compass calibration adjacent the common craft azimuth or heading reference index 52 indicates the heading of the aircraft relative to the magnetic north and any change in heading of the craft will be indicated by rotation of the compass card relative to the common index 52.

Heading selector knob 41 is provided for manually establishing, i. e., setting the magnetic bearing of a selected course and for generating a signal proportional to the difference between the actual aircraft heading and the selected aircraft heading. When the selector knob 41 is pulled out and rotated to a position corresponding to a selected heading, the rotor of control transformer 48 is rotated relative to its stator, which is fixed to the craft, through one input of differential 43. Since the other input of differential 43 can be considered as being fixed due to the high gear reduction 106 between compass card servomotor 34 and compass card 28, the output of differential rotates gear 44 which, in turn, positions the heading selector 39 in accordance with rotation of heading selector knob 41. Furthermore, since the stator of control transformer 48 is also connected to compass transmitter 102, a signal voltage proportional to the difference between the actual course or heading of the aircraft and the selected course or heading is generated in the rotor of control transformer 48. Thus, there is provided a heading error signal proportional to the difference between the actual aircraft heading and the desired aircraft heading, this signal being applied as one of the inputs to summing amplifier and limiter 107 which controls the position guidance indicator member 53 relative to the common craft reference index 52. in a manner to be described below.

As described above, the shade-like horizon indicator element 76 is positioned in accordance with the roll attitude of the craft by rotating frame member 82 through roll servomotor 83. For this purpose, a conventional servo loop between a vertical reference such as a vertical gyro 110 and the frame 82 is provided. Attached to the roll axis of the vertical gyro 110 is a synchro transmitter 111 for supplying a signal proportional to the roll attitude of the craft relative to the vertical established by the gyro, this signal being compared in control transformer 112 with the position of the frame 82. If any error exists between frame 82 and the craft's roll attitude established by vertical gyro 110, an output signal will be generated at control transformer 112 and applied to a roll servo amplifier 113, the output of which drives motor 83 in such a direction and to an amount as to reduce the error signal to zero, thereby establishing correspondence between the frame 82 and the vertical established by gyro 110. Again, a suitable speed generator 114 may be provided for stabilizing this servo loop. The output from the synchro 111 corresponding to the roll angle of the craft relative to vertical is applied as another input to the summing amplifier and limiter 107 for further controlling the position of azimuth guidance pointer 53 relative to the same craft reference index 52 against which the roll attitude indicating line or screen 76 is also read.

As above described, the shade-like horizon indicator 76 is positioned in pitch through relative rotation of disc 85 and frame 82 through pitch servomotor 86 and differential 88. Pitch servomotor 86 is actuating in accordance with a signal corresponding to the difference between the position of disc 85 and the actual pitch of the craft as determined by vertical gyro 110 through a similar servo loop including control synchro transmitter 115 on the pitch axis of gyro 110, control transformer 116, and pitch servo amplifier 117, a suitable speed generator 118 being again provided for stabilization purposes. The signal from synchro 115 corresponding to the pitch attitude of the craft is also supplied to summing amplifier and limiter 119 for controlling in part the pitch guidance indicator 54.

Guidance indicators 53 and 54 are positioned in accordance with the craft's displacement and attitude relative to the predetermined flight path in the same manner as the cross pointers described in the above-noted Kellogg patent. The azimuth indicator 53 is positioned by a servo loop including servomotor 62 controlled in accordance with the output of azimuth cross pointer amplifier 125. One of the inputs thereof is an output signal from summing amplifier and limiter 107 and another input is a signal corresponding to the position of the azimuth pointer 53 as represented by a position feedback signal from transmitter 126. Also, the operation of the servomotor 62 may be stabilized by means of speed generator 127 as in conventional servo systems. Elevation guidance indicator 54 is likewise positioned by a servo loop including servomotor 69 controlled in accordance with the output of elevation cross pointer amplifier 128. Again, one of the inputs of this amplifier is the output of summing amplifier and limiter 119 and a position feedback signal corresponding to the position of the indicator 54 as represented by signal transmitter 129. Again, a stabilization voltage may be supplied by speed generator 130.

As explained more fully in the above-noted Kellogg patent, a suitable selector switch 131 is provided for the purpose of selecting a desired flight plan. An indexed knob indicates the particular flight plan chosen and, through switches controlled by the knob, circuits are established for supplying correct signals in their proper relative polarity sense as inputs to the summing amplifiers 107, 119 and a change of flight plan can be introduced at any time by manipulation of the switch. The selector switch 131 enables the pilot to choose the following flight facilities; Flight Instruments, Approach, Omni Directional Range (ODR), Localizer Beam (LOC), In-bound or Out-bound Sensing (blue right or blue left), and Altitude Control. Thus, the signals supplied as inputs to the summing amplifier 107 for controlling the azimuth guidance pointer 53 are, depending upon the flight plan selected, a signal corresponding to the lateral displacement of the aircraft from a selected radio beam, a signal proportional to the difference between the actual craft heading and a desired selected craft heading (when radio signals are used the selected heading is the bearing of the radio beam), and a signal proportional to the roll attitude of the craft. Likewise, the signals supplied as inputs to the summing amplifier 119 for controlling the horizontal or elevation guidance indicator 54 includes a signal corresponding to the vertical displacement of the craft from a selected radio beam, such as, for example, a glide slope beam, or a signal corresponding to vertical displacement from a selected altitude, and a signal proportional to the pitch attitude of the craft.

Figures 7, 8, 10, 12:
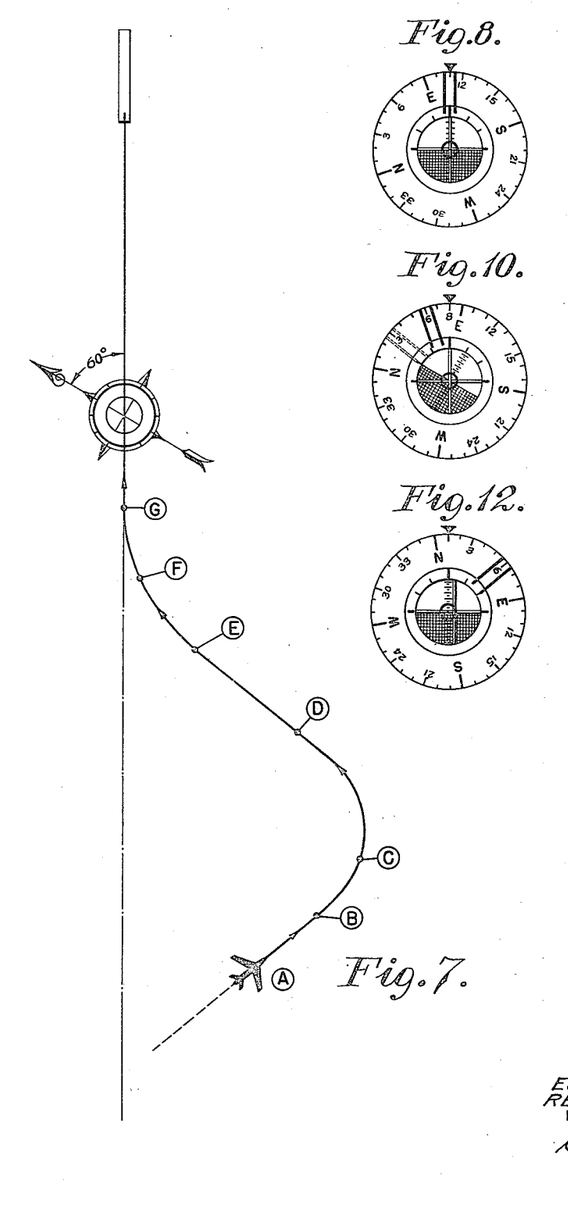
Fig. 7 is a diagram illustrating an arbitrary flight path which may be pursued by a craft when seeking the localizer beam of an instrument landing system.
Figs. 8 to 14, inclusive, are views of the instrument as seen by the pilot when the craft is at various positions on the flight path illustrated in the diagram of Fig. 7.

The manner in which these signals are combined and correlated to operate the guidance indicators 53 and 54 and the manner in which the movable indicating elements of the indicator of the present invention are operated therewith may best be understood by considering the operation of the instrument during a typical flight procedure in which the craft is controlled in accordance with the indications presented in approaching and maintaining a selected radio course. Such a flight procedure is illustrated in Fig. 7 which shows the track of an aircraft as it approaches and maintains an I. L. S. radio beam. Figs. 8 through 14 show the indications presented by the indicator at various points during this flight procedure.

Figure 9:
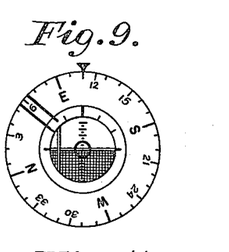

In the exemplary flight procedure illustrated in Fig. 7, let us assume the craft is at point A and proceeding on flight instruments along a preselected course having a magnetic bearing of 110°. The indication of the instrument provided by the present invention under this flight condition is illustrated in Fig. 8 and it is seen that the heading selector 39, guidance indicator 53, the present craft heading on compass card 28, and pitch dots 73 providing the roll reference, are all aligned with craft reference index 52 and is considered to define a line corresponding to a line in space along which the craft is proceeding. At point B, assume the pilot desires to approach and maintain an I. L. S. radio beam having a bearing of 60° magnetic. The pilot sets the selector switch to the localizer (LOC) position thereby supplying a signal from radio receiver 132 proportional to the lateral displacement of the craft from the localizer radio beam to summing amplifier 107. Also, the pilot adjusts heading selector 39 through knob 41 so that the two parallel lines thereon embrace, i. e., lie symmetrically on each side of the 60° calibration on compass card 28. Such manual setting of the bearing of the radio beam through differential 43 generates a signal at control transformer 48 proportional to the difference between the present heading of the craft and the bearing of the radio beam. Upon completion of these settings, the azimuth guidance indicator servo loop is controlled by a limited signal corresponding to the algebraic sum of a signal proportional to the heading difference between the selected craft heading and the bearing of the radio course and a signal proportional to the lateral displacement of the craft from the radio beam. Thus, the azimuth guidance element 53 is displaced to the left of craft index 52 in accordance therewith. These control signals are preferably limited and, for example, in the manner set forth in the above-mentioned Kellogg patent so as to limit the angle of approach of the craft to the beam. At point B then, the indicator will appear as illustrated in Fig. 9, i. e., the guidance pointer 53 commands a left turn. Following this indicated command, the pilot banks the craft to the left thereby causing the craft to turn toward the radio beam. As the craft banks, a roll signal is generated at the vertical gyro 110 which generates a signal proportional to the bank angle, this bank angle signal being applied as a third input to summing amplifier 107. As explained in the above-mentioned Kellogg patent, the combined displacement and heading signals, preferably limited, are matched with the bank signal so that when the signal corresponding to the bank angle of the craft exactly cancels the same, the output of summing amplifier therefore will reduce to zero, thereby immediately centering or zeroing the guidance indicator 53 with reference to the index 52. Thus, although the craft is still displaced from the radio course, the pilot is advised, through the zeroing of guidance indicator 53, that he is proceeding along a course which will eventually bring him to the radio course. Since the roll or bank signal is also supplied to the roll indicator servo loop to thereby stabilize horizon 81 and pitch dots 73, the pilot is advised of his exact roll attitude, i. e., he is advised as to the amount of roll control requred to satisfy the control demands of the guidance indicator 53.

During the turn, the indicator appears as illustrated in Fig. 10 with the compass card and heading selector rotating together indicating a constantly changing heading of the craft toward the left. As the craft approaches the 60° heading set by the heading selector, the heading difference signal will become less and less. However, since the craft is still considerably displaced from the radio beam, the radio displacement signal will still be present and above the limits imposed thereon and would normally tend to move the guidance indicator 53 to the left. However, the bank angle signal is still present to cancel the limited radio signal and therefore guidance indicator 53 will remain at zero, i. e., on the craft reference index 52.

Figure 11:
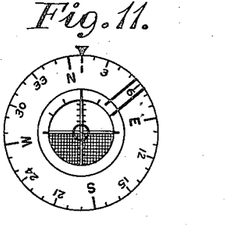
Figure 13:
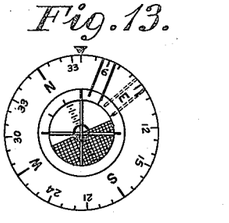

As the heading of the craft changes during the turn from B to D in Fig. 7, the heading difference signal will go to zero when the craft is on a 60° heading and will reverse in polarity as the heading of the craft continues to swing to the left. When the heading signal builds up in the opposite polarity, a point will be reached where the heading signal is equal and opposite to the limited radio displacement signal. Under this signal conditon the roll or bank signal will predominate and therefore the pilot must roll out of the turn to reduce the bank angle signal in order to maintain the guidance indicator 53 on the craft reference index 52. Such a reduction of bank angle will continue until the heading difference signal exactly equals the radio displacement signal. The above condition obtains when the craft is at point D, and the indicator under these conditions will appear as illustrated in Fig. 11. Again, the horizon indicator 80 and reference dots 73 will inform the pilot that he has, in fact, rolled out of turn and that he is flying a straight and level course.

Figure 14:
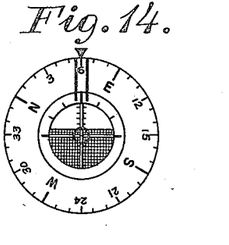

The craft will now proceed along a straight line course determined by a limited radio displacement signal which is exactly equal and opposite to the heading difference signal. However, at point E along the course illustrated in Fig. 7, the radio displacement signal will drop below the predetermined limit and thus the heading difference signal will predominate and cause guidance indicator 53 to move to the right as illustrated in Fig. 12. The pilot returns guidance indicator 53 to reference 52 by banking to the right. The magnitude of the bank angle will depend on the magnitude of the difference between the diminished radio displacement signal and the heading difference signal, and, as above, the magnitude of the bank angle will be indicated to the pilot by the horizon indicator 81 and reference dots 73. As the craft turns to the right in response to the bank, compass card 28 will rotate to the left, indicating the craft is approaching the 60° bearing of the radio beam. As the craft rolls to the right and a right turn takes place, the heading difference signal also begins to decrease. As the approach continues and the radio displacement signal decreases, the heading difference signal also decreases due to turning of the craft in response to its bank angle. Furthermore, as the radio displacement signal approaches zero, the heading displacement signal must also approach zero. This is accomplished by reducing the bank angle and hence reducing the turning rate of the craft. When the craft is on the radio beam and aligned with it in straight and level flight, all signals will be reduced to zero and the indicator will appear as illustrated in Fig. 14 wherein it will be noted that the roll reference defined by the pitch dots 73, the heading selector 39, and guidance indicator 53, are all mutually aligned with the common craft reference 52. After the craft has attained the radio beam in the manner above set forth, any deviation of the craft therefrom will be clearly and immediately indicated to the pilot by a discontinuity in the substantially straight line defined by heading selector 39, reference dots 73, and guidance indicator 53 relative to the common craft reference 52.

During the entire approach procedure above described, the pilot is informed, by movements of heading selector 39 and bank reference 81 and 73, of the magnitude and sense of the control parameters heading and bank attitude which operate to control the azimuth guidance indicator 53. The magnitude and sense of these control parameters is indicated in the instrument of the present invention by movement of elements responsive thereto relative to the same common craft reference index to which the guidance indicator 53 controlled thereby is also referred.

During the approach of the craft to the radio beam it may be assumed that the craft has been flying a constant altitude as determined by an altitude deviation signal generated by altitude control 133 applied to summing amplifier limiter 119. The manner in which the aircraft is controlled in pitch in response to the altitude signal and the pitch attitude signal supplied by vertical gyro 110 is exactly the same as that described in the above-mentioned Kellogg patent and a detailed description thereof is not deemed necessary in the present application except to say that, in the instrument of the present application, pitch attitude, the prime control parameter for the guidance elevation indicator 54 is displayed by up and down movement of the horizon 81 through the pitch indicator servo loop and the horizontally disposed flight indicator bar 54 is operated in accordance with the alebraic sum of the altitude (or glide slope signal) and the pitch signal. Similarly, the operation of the present instrument in approaching and maintaining the glide slope beam of an I. L. S. system as defined by glide slope receiver 134 is also the same as that disclosed in detail in the above-mentioned Kellogg patent and a detailed description thereof in this application is deemed unnecessary.

Figure 15:
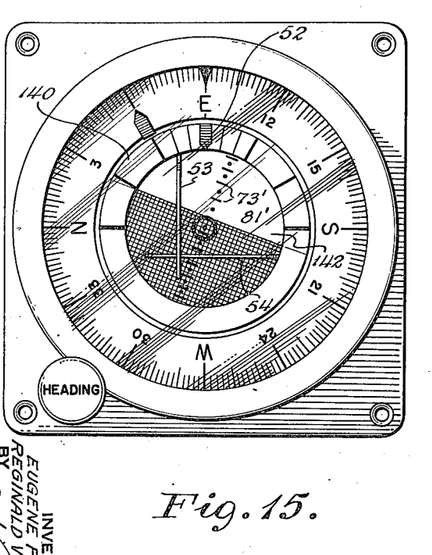
Fig. 15 is a front elevation view of the face of an instrument constructed in accordance with a modification of the instrument illustrated in Figs. 1 to 3, inclusive.
Figure 16:
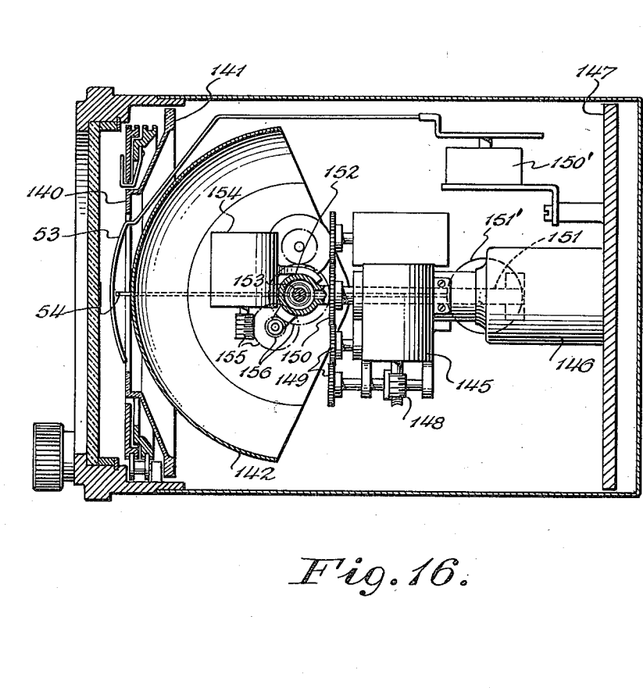
Fig. 16 is a sectional view of the instrument of Fig. 15 taken in about the plane 16—16 of Fig. 15.

In Figs. 15 and 16 there is illustrated another embodiment of the instrument of the present invention. The bezel of the instrument shown in Figs. 15 and 16 is substantially identical to that shown in Figs. 1, 2, and 3. However, in the embodiment illustrated in Figs. 15 and 16, the fixed annular ring member 140 is transparent and is secured to instrument support plate 141. The transparent member 140 has inscribed thereon the common craft reference 52. Suitable bank references may also be provided on this transparent ring member. Since ring member 140 is transparent the effective visible area of the critical portion of the instrument defined by annular compass card 28 is greatly increased. In this embodiment the guidance indicators 53 and 54 instead of moving parallel to the face of the instrument as in the embodiment of Figs. 1 and 3, move in large radius arcs by means of galvanometer movements 150' and 151', respectively. In this case, the outputs from summing amplifier and limiters 107 and 119 are applied directly to the galvanometer movements 150' and 151' thereby eliminating the guidance indicator servo loops described above and hence save space and reduce the complexity of the instrument. Behind guidance indicators 53 and 54 and forming a background therefor is a generally spherical-shaped member 142 having inscribed on the face thereof a horizon reference line 81' and pitch reference dots 73', which dots as in the embodiment of Figs. 1, 2 and 3 together form a vertical roll reference or meridian line. The spherical background member 142 is stabilized in roll and in pitch by means of servo loops as shown in Fig. 6. In Fig. 16 the roll servomotor 145 is fixed to a hub 146 secured to the instrument base plate 147 and drives the spherical member 142 in roll through worm and gear connection 148 and gears 149 and 150, the gear 150 being secured to a trunnion 151 pivotally supported in hub 146 for rotation about the longitudinal axis of the instrument. Secured to the trunnion 151 is a laterally extending hub member 152 and pivotally supported therein is a shaft 153 at the ends of which is secured the spherical member 142. Since hub member 152 is stabilized in roll through trunnion 151 by roll servomotor 145, spherical member 142 is likewise stabilized in roll.

Secured to hub 152 is a pitch servomotor 154 connected to drive shaft 153 through worm and gear connections 155 and gear 156 to thereby stabilize the sphere in pitch. It may be noted that in the embodiment of the present invention illustrated in Fig. 16 a differential between the roll and pitch servomotors is not required inasmuch as the pitch motor is itself stabilized in roll by the roll servomotor 145.

The operation of the embodiment illustrated in Figs. 15 and 16 is substantially identical to that above described with respect to the embodiment illustrated in Figs. 1, 2 and 3, and further description thereof is deemed unnecessary.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A navigation instrument for aircraft comprising a craft-guidance indicator for indicating to a pilot whether to fly the craft toward the right or the left, a stabilized annular compass card disposed to rotate about said guidance indicator, a heading selector member settable relative to said compass card but otherwise movable therewith for indicating the bearing of a selected course relative to the heading of said craft, means for setting said member relative to said compass card, and a fixed index representing the fore and aft axis of said craft and forming a reference for said card and said craft-guidance indicator, whereby when said craft is proceeding along a selected course said member and said craft-guidance indicator will be in alignment with said reference index.

2. A navigation instrument for aircraft comprising craft-guidance member for indicating to a pilot whether to fly the craft toward the right or the left, a stabilized annular compass card disposed to rotate about said guidance member, a cursor settable relative to said compass card but otherwise movable therewith for indicating the angular relationship of a selected course relative to the heading of said craft, means for setting said cursor relative to said compass card, a fixed index representing the fore and aft axis of said craft located between said guidance member and said compass card and forming a common reference for said card and said craft guidance member, whereby when said craft is proceeding along a selected course said cursor and said craft-guidance member will be in alignment with said reference index.

3. A navigation instrument for aircraft comprising a craft-guidance pointer for indicating to a pilot whether to fly the craft toward the right or the left, a stabilized annular compass card disposed to rotate about said guidance pointer, a selector member settable relative to said compass card but otherwise movable therewith for indicating the angular relationship of a selected course relative to the heading of said craft, means for setting said member relative to said compass card, a fixed annular member located between said guidance pointer and said compass card, an index on said annular member representing the fore and aft axis of said craft and forming a common reference for said card and said craft-guidance pointer, whereby when said craft is proceeding along a selected course said course selector member and said guidance pointer will lie in substantial alignment with said common reference index.

4. A navigation instrument for aircraft comprising a craft-guidance pointer for indicating to a pilot whether to fly the craft toward the right or left, means for positioning said guidance pointer to the right or left in accordance with the displacement of said craft from a predetermined course, an annular compass card disposed to rotate about said guidance pointer, means for stabilizing said compass card relative to a fixed direction in space, a selector cursor settable relative to said compass card but otherwise movable therewith for indicating the angular relationship of a selected course relative to the heading of said craft, means for setting said cursor to a desired heading relative to the heading defined by said compass card, a fixed annular member located between said compass card and said guidance pointer, a reference index on said annular member representing the fore and aft axis of said craft and forming a common reference for said card and said craft-guidance pointer, whereby when said craft is proceeding along a selected course said selector cursor and said guidance pointer will lie in substantial alignment with said reference index.

5. A navigation instrument for aircraft comprising an annular compass card for indicating the magnetic heading of said craft, a selector cursor settable relative to said compass card but otherwise movable therewith for indicating the angular relationship of a selected course relative to the heading of said craft, means for setting said cursor relative to said compass card, a bank indicator positioned within the space defined by said annular compass card for indicating the bank attitude of said craft, a maneuver command indicating member also positioned within the space defined by said compass card and responsive at least in part to banking of said craft for indicating to a pilot whether to fly the craft toward the right or the left, and a fixed index representing the fore and aft axis of said craft and forming a reference for said compass card and for said command member, whereby when said craft is proceeding along said selected course said heading selector, said bank indicator, and said command member will lie in alignment with said reference index.

6. A navigation instrument of the character set forth in claim 5 wherein said bank indicator includes an element having a surface area which substantially fills the space defined by said annular compass card whereby to form a background for said maneuver command indicator.

7. A navigation instrument for aircraft comprising an annular compass card for indicating the magnetic heading of said craft, a selector cursor settable relative to said compass card but otherwise movable therewith for indicating the angular relationship of a selected course relative to the heading of said craft, means for setting said cursor relative to said compass card, a bank indicator positioned within the space defined by said annular compass card for indicating the bank attitude of said craft, a maneuver command indicator pointer also positioned within the space defined by said compass card and responsive at least in part to the bank attitude of said craft for indicating to a pilot whether to bank the craft toward the right or the left, and a fixed index representing the fore and aft axis of said craft located between said command pointer and said compass card and forming a common reference for said compass card and said command pointer, whereby when said craft is proceeding along said selected course said cursor, said bank indicator, and said command pointer will lie in alignment with said reference index.

8. A navigation instrument of the character set forth in claim 7, wherein said fixed index is carried by a fixed annular member located between said compass card and said bank and maneuver command indicators.

9. A navigation instrument for aircraft comprising a maneuver command indicator member for indicating to a pilot the sense and amount of craft attitude control required to cause the craft to approach and maintain a preselected radio course defined by a directional radio beam, means for providing signals corresponding to the lateral displacement of said craft from said radio beam, the heading of said craft relative to the bearing of said beam, and the bank attitude of said craft, means responsive to said signals for positioning said command member in accordance with the algebraic sum thereof, said sum being zero not only when the craft is on said course but also when it is off said course but in an attitude which will return the same asymptotically to said course, a bank indicator disposed behind said member for indicating the bank attitude of said craft, means for positioning said bank indicator in response to said bank signal, an annular compass card surrounding said member and said bank indicator for indicating the heading of said craft, means for stabilizing said compass card relative to a fixed direction in space, a selector cursor settable relative to said compass card but otherwise movable therewith for indicating the angular relationship between the heading of said craft and the bearing of said radio beam, means for setting said cursor relative to said compass card, and a fixed index representing the fore and aft axis of said craft and forming a reference for said compass card and said cursor and a zero reference for said member, whereby when said craft is proceeding along said radio beam said command member, said cursor, and said bank indicator, will lie in substantial alignment with said reference index and when off said beam said bank indicator and said cursor will indicate the amount of attitude control applied to maintain said guidance member aligned with said index.

10. A navigation instrument of the character set forth in claim 9 wherein said fixed reference index is located between said compass card and said guidance member and bank indicator and forms a common reference therefor.

11. A navigation instrument of the character set forth in claim 9 wherein said common reference index is carried by a fixed annular member located between said compass card and said guidance member and bank indicator.

12. A navigation system for aircraft comprising means for providing a signal corresponding to the magnetic heading of said craft, an annular compass card, means responsive to said heading signal for positioning said compass card, means including a course selector cursor settable relative to said compass card but otherwise movable therewith for indicating the angular relationship between the bearing of a selected radio course and the heading of said craft, means for setting said cursor to the bearing of said radio course on said compass card, means responsive to said setting means for providing a signal proportional to the angle between the bearing of said radio course and the heading of said craft, means for providing a signal corresponding to the roll attitude of said craft, a roll indicator disposed within the space defined by said annular compass card, means responsive to said roll signal for positioning said roll indicator in accordance therewith, a maneuver command indicator member also disposed within the space defined by said annular compass card and overlying said roll indicator, means for providing a signal corresponding to the lateral displacement of said craft from said radio course, means responsive to said displacement signal, said heading signal, and said roll signal for positioning said command indicator member in accordance with the algebraic sum thereof, whereby to indicate to a pilot the sense and amount of attitude control required to cause said craft to approach and maintain said radio course, and a fixed index representing the fore and aft axis of said craft and forming a common reference for said compass card and said member, whereby when said craft is proceeding along said radio course said cursor, said command member, and said roll indicator will lie in substantial alignment with said reference index.

13. A navigation system of the character set forth in claim 12 wherein said fixed reference index is carried by a fixed annular member located between said compass card and said command member and bank indicator.

14. A navigation instrument of the character set forth in claim 12 wherein said roll indicator comprises a broad, flexible belt-like element positioned to extend crosswise of the space defined by said annular compass card in a manner to present its broad, flat surface to view, said belt-like member having a central meridian line thereon normally aligned with said reference index, and means connected with said belt-like element for positioning the same in accordance with the roll attitude of said craft, whereby the magnitude of the bank angle is determined by the displacement of said meridian line from said reference index.

15. A navigation instrument of the character set forth in claim 12 wherein said maneuver command indicator member comprises a substantially straight pointer normally coincident with said reference index, means for supporting said pointer for movement to the right or left of said index in a linear manner and parallel to the plane defined by said annular compass card, and means connected with said supporting means for so moving said pointer.

16. A navigation instrument of the character set forth in claim 12 wherein said roll angle indicator comprises a spherical member having a horizon line thereon, and means responsive to said roll signal for positioning said spherical member in accordance with the roll attitude of said craft, and wherein said maneuver command indicator member includes an arcuate pointer generally conforming to the surface of said spherical member but slightly spaced therefrom, and means coupled with said pointer for positioning the same to the right and left of said reference index.

17. A navigation instrument of the character set forth in claim 9 wherein said bank indicator substantially fills the space defined by said annular compass card whereby to form a background for said maneuver command indicator member.

References Cited in the file of this patent

UNITED STATES PATENTS

| | | |
|---|---|---|
| 2,264,279 | Dearing | Dec. 2, 1941 |
| 2,364,731 | Luck | Dec. 12, 1944 |
| 2,424,570 | Jenks | July 29, 1947 |
| 2,467,972 | French | Apr. 19, 1949 |
| 2,613,352 | Kellogg | Oct. 7, 1953 |
| 2,685,226 | Crane | Aug. 3, 1954 |